United States Patent [19]
Morin et al.

[11] 3,853,470
[45] Dec. 10, 1974

[54] REAGENT AND METHOD FOR GLUCOSE DETERMINATION

[75] Inventors: Leo G. Morin; Jerome R. Prox, both of Miami, Fla.

[73] Assignee: Medico Electronic, Inc., Indianapolis, Ind.

[22] Filed: Aug. 30, 1972

[21] Appl. No.: 284,888

[52] U.S. Cl.................. 23/230 B, 252/408, 424/2, 424/7
[51] Int. Cl...................... G01n 31/22, G01n 33/16
[58] Field of Search.................. 23/230 B; 424/2, 7; 252/408

[56] References Cited
UNITED STATES PATENTS
2,848,308  8/1958  Free................................ 23/253 TP

OTHER PUBLICATIONS

Snell et al., Colorimetric Methods of Analysis, 1953, D. Van Nostrand Co., page 200. QD113562 1948.

O. Tomicek, Chemical Indicators, Butterworths, London, 1951, pp. 171–175. QD77T65E.

*Primary Examiner*—Robert M. Reese
*Attorney, Agent, or Firm*—Christen & Sabol

[57] ABSTRACT

A reagent and method for the fast (under 5 minutes) determination of glucose in biological fluids by the peroxidase catalyzed oxidation of sulfonated phenyl amines or sulfonated benzidines by hydrogen peroxide formed from the action of glucose oxidase on glucose.

18 Claims, No Drawings

REAGENT AND METHOD FOR GLUCOSE DETERMINATION

BACKGROUND OF THIS INVENTION

1. Field of this Invention

This invention relates to a novel reagent and method for the determination of glucose in biological fluids; and more particularly, to a novel method for the determination of glucose by the coupled glucose oxidase-peroxidase reaction utilizing sulfonated redox indicators.

2. Prior Art

The determination of glucose is easily the most frequently performed test in clinical laboratories. It is useful in the diagnosis of various diabetic conditions, pancreatic diseases, renal diseases, cirrhosis, alcoholism, pregnancy, and a number of degenerative vascular diseases. There are two basic approaches to glucose determinations: (1) chemical, and (2) enzymatic. Chemical procedures depend on the reducing capacity of glucose and are, therefore, relatively non-specific. In addition, they usually require considerable heat and time to perform. Enzymatic procedures are generally preferred because of greater specificity. There are two fundamental enzymatic approaches: (1) the hexokinase-glucose-6-phosphate dehydrogenase reaction, and (2) the glucose oxidase-peroxidase reaction. The former is subject to more endogenous interfering substances and requires an ultraviolet spectrophotometer. The latter should be more specific and is colorimetric. Both enzymatic approaches require a minimum of 15 minutes to perform. The present redox indicator of choice in the art is 3,3'dimethoxybenzidine dihydrochloride. This indicator and other less favorable indicators suffer from poor solubility in a buffered medium. There is a genuine need for a glucose procedure that can be performed quickly, in less than 5 minutes, and which does not have solubility problems. It is desirable in addition to have a reagent that can be completely freeze-dried to better preserve the activity of the enzymes and have the convenience of merely adding water to reconstitute to a usable condition.

BROAD DESCRIPTION OF THIS INVENTION

It is the primary object of this invention to provide a reagent and method for determining glucose in biological fluids directly within less than 5 minutes.

It is another object of this invention to provide such a reagent that will not have turbidity problems due to poor solubility of the redox indicator.

It is a further object of this invention to provide a reagent that could easily be freeze-dried completely, requiring only the addition of water to restore it to usefulness.

Other objects of this invention will become apparent from the following description.

It has been found that, contrary to normal expectations, the glucose oxidase-peroxidase reaction time cannot be shortened successfully by merely increasing the level of glucose-oxidase activity. It has been determined that this is due to trace contamination of glucose oxidase by catalase, the latter competing non-selectively with peroxidase for hydrogen peroxide. The solution to this problem has been found to be twofold: (1) the pH of the reaction medium must be reduced to a level unfavorable to the action of catalase, but not deleterious to glucose oxidase; (2) the consequent unfavorable effect on peroxidase (peroxidase having a similar preferred pH as catalase must be overcome by increasing the peroxidase level in a ratio of about 3:1 to the glucose oxidase. It has been further determined that sulfonated redox indicators are much more suitable than the currently preferred indicators. The following have been found to have significantly better characteristics as redox indicators for the glucose oxidase-peroxidase reaction than the indicators presently being used in the art: diphenylaminesulfonic acid and its salts, diphenylbenzidinesulfonic acid and its salts, and Calcocid Blue 2 G (Color Index 42090), which is the tradename for a triphenylmethane dye, and its salts.

The reagent (of this invention) for glucose determination in biological fluids comprises, broadly, glucose oxidase, peroxidase, a sulfonated phenylamine or sulfonated benzidine redox indicator, and a buffer, the pH of the reagent being between 4.0 and 5.9 and the ratio of glucose oxidase, based on the EU units thereof present, to peroxidase, based on the Purpurogallin units thereof present, being between 250:3 and 50:1.

Preferably, this invention is practised by dissolving 5,000 to 25,000 EU units (one unit will oxidize 1 micromole of glucose to gluconic acid and hydrogen peroxide per minute at pH 5.1 at 35° C.) of glucose oxidase and 60 to 400 Purpurogallin (PU) units (one unit is equivalent to the formation of 1 mg of purpurogallin in 20 seconds from pyrogallol at pH 6.0 at 20° C.) of peroxidase in one liter of solution made up of 0.01 to 2 M sodium citrate buffer or suitable amounts of another suitable buffer, 0.3 to 3 grams of a sulfonated phenylamine such as diphenylaminesulfonate and Calcocid Blue 2 G or a sulfonated benzidine as diphenylbenzidinesulfonate, and the remainder water. The pH is between 4.0 and 5.9. This reagent may be stored under refrigeration or freeze-dried. The freeze-dried reagent can be restored to usefulness by the mere addition of water.

In the determination of glucose, the biological fluid is mixed with the reagent in a ratio of 1/100 to 1/25. The glucose concentration is determined colorimetrically from the absorbance between 410 to 740 nm, depending on the redox indicator used; of those mentioned, diphenylaminesulfonate and diphenylbenzidine are measured between 410 and 540 nm, preferably at 450 nm, and Calcocid Blue 2 G is measured between 540 and 740 nm, preferably at 680 nm. Direct measurements of the absorbance can be made in less than 5 minutes.

The reagent of this invention does not have turbidity problems due to poor solubility of the redox indicator in the required pH range.

The biological fluid can be those of man or animal. Examples of such biological fluids are serum, plasma, urine and spinal fluid.

DETAILED DESCRIPTION OF THIS INVENTION

The preferred redox indicators are the di-phenylaminesulfonic acids, and the preferred di-phenylaminesulfonic acid is p-diphenylaminesulfonic acid. The ortho and meta forms of diphenylaminesulfonic acid can be used. Examples of salts of diphenylaminesulfonic acid are: sodium p-diphenylaminesulfonate (most preferred); barium p-diphenylaminesulfonate; potassium p-diphenylaminesulfonate; lithium p-diphenylaminesulfonate; zinc p-diphenylaminesulfonate; aluminum p-diphenylaminesulfonate; iron p-diphenylaminesulfonate; nickel p-diphenylaminesulfonate; tin p-diphenylaminesulfonate; copper p-diphenylaminesulfonate; sodium o-diphenylaminesulfonate; potassium o-diphenylaminesulfonate; lithium o-diphenylaminesulfonate; calcium o-diphenylaminesulfonate; ammonium o-diphenylaminesulfonate; sodium m-diphenylaminesulfonate; lithium m-diphenylaminesulfonate; and barium m-diphenylaminesulfonate.

Examples of salts of N,N'-diphenylbenzidinesulfonic acid are: sodium N,N'-diphenylbenzidinesulfonate; lithium N,N'-diphenylbenzidinesulfonate; calcium N,N'-diphenylbenzidinesulfonate; potassium N,N'-diphenylbenzidinesulfonate; ammonium N,N'-diphenylbenzidinesulfonate; lead N,N'-diphenylbenzidinesulfonate; zinc N,N'-diphenylbenzidinesulfonate; and barium N,N'-diphenylbenzidinesulfonate.

Examples of salts of Calcocid Blue 2 G are: the sodium salt of Calcocid Blue 2 G; the lithium salt of Calcocid Blue 2 G; the ammonium salt of Calcocid Blue 2 G; the magnesium salt of Calcocid Blue 2 G; the potassium salt of Calcocid Blue 2 G; the lead salt of Calcocid Blue 2 G; and the barium salt of Calcocid Blue 2 G.

In general, salts formed from single valence metals are preferred, but salts formed from metals having higher valences can be used. In general, salts formed from alkali and alkaline earth metals are preferred.

The preferred buffer is sodium citrate. Examples of other suitable buffers are: citrates such as, barium citrate, lithium citrate, potassium citrate, calcium citrate and ammonium citrate; phosphates, such as sodium phosphate, barium phosphate, lead phosphate, magnesium phosphate, zinc phosphate, iron phosphate, lithium phosphate and ammonium phosphate; acetates, such as sodium acetate, lithium acetate, barium acetate, calcium acetate, and potassium acetate; fumaric acid salts, such as sodium fumarate, calcium fumarate, lithium fumarate and barium fumarate and salts of glycine, such as the sodium salt. Any buffer can be used which has a pK value which allows it to operate in part or all of the pH range of 3 to 7, preferably in the pH range of 4.0 to 5.9.

Any suitable colorimeter or spectrophotometer can be used to measure the absorbance. Examples of useful colorimeters are: Coleman, Model 44; Perkin-Elmer, Model 124; the colorimeter disclosed in U.S. Ser. No. 224,457, applicants: Raymond W. Kiess and Peter H. Stewart, filed: Feb. 8, 1972, assignee: Kiess Instruments, Inc., 8768 S.W. 131st Street, Miami, Fla., 33156; and the direct reading colorimeter disclosed in U.S. Pat. No. 3,561,878, inventor: R. W. Kiess.

The term acid buffer or buffer, as used herein, means that an acid and a salt thereof is included, or that two or more salts are used. An example is citrate buffer which includes citric acid and a salt or ester thereof, e.g., sodium citrate, potassium citrate, barium citrate and lithium citrate.

As used herein, room temperature is defined as 68° F. to 78° F.

The following examples are included to further illustrate the invention, but they do not limit it.

EXAMPLE 1

A reagent is prepared by dissolving 60 mg of glucose oxidase (15,000 EU/g), 30 mg of peroxidase (125 PU/mg), and 90 mg of sodium p-diphenylaminesulfonate in 100 ml of 0.1 M sodium citrate buffer (water solution), at pH 5.5. To a series of tubes is added 2.5 ml of the reagent. Standards are prepared and made to contain 100, 200, 300, 400 and 500 mg% of glucose. To each tube is added 50λ of a specified standard. An intense stable amber color develops within 2 minutes. Each tube is placed in a colorimeter (Coleman Model 44) and the absorbance determined at 450 nm. It is found that there is a linear proportion between absorbance and the concentration of glucose.

EXAMPLE 2

A reagent is prepared as in Example 1. Standards are prepared as in Example 1, except they are prepared in serum. The test is run as in Example 1. There is a linear proportion between absorbance and the concentration of glucose.

EXAMPLE 3

A reagent is prepared as in Example 1 and stored under refrigeration for a month. The test is run as in Example 2. There is a linear proportion between absorbance and the concentration of glucose. The results are the same as in Example 2.

EXAMPLE 4

A reagent is prepared as in Example 1, except all concentrations are increased by a factor of 5. The reagent is dispensed in 0.5 ml quantities to a set of ampules and freeze-dried, then sealed under nitrogen. After a year, the reagent is reconstituted to 2.5 ml with distilled water and the test conducted as in Example 2. There is a linear proportion between absorbance and the concentration of glucose.

EXAMPLE 5

A reagent is prepared as in Example 1, except that sodium diphenylaminesulfonate is replaced by Calcocid Blue 2 G, which has been previously reduced with zinc dust. The test is conducted as in Example 2, except that absorbance is read at 680 nm. There is a linear proportion between absorbance and the concentration of glucose.

EXAMPLE 6

A reagent is prepared as in Example 1, except that sodium diphenylaminesulfonate is replaced by sodium diphenylbenzidinesulfonate. The test is conducted as in Example 2. There is a linear proportion between absorbance and the concentration of glucose.

What is claimed is:

1. A reagent for glucose determination in biological fluids consisting of glucose oxidase, peroxidase, a member selected from the group consisting of a sulfonated phenylamine redox indicator and a sulfonated benzidine redox indicator, water and a buffer, the pH being between 4 and 5.9 and the ratio of glucose oxidase based on the EU units thereof present, to peroxidase, based on the purpurogallin units thereof present, being between 250:3 and 50:1.

2. A reagent according to claim 1 wherein the sulfonated redox indicator is diphenylaminesulfonate.

3. A reagent according to claim 1 wherein the sulfonated redox indicator is diphenylbenzidinesulfonate.

4. A reagent according to claim 1 wherein the sulfonated redox indicator is Calcocid Blue 2 G (Color Index 42090).

5. A reagent according to claim 1 wherein the sulfonated redox indicator is present at a level of 30 to 900 mg percent.

6. A reagent according to claim 1 wherein the buffer is a sodium citrate buffer.

7. A reagent according to claim 1 wherein the pH is about 5.5.

8. A reagent according to claim 1 wherein the reagent contains 5,000 to 25,000 EU units of glucose oxidase, 60 to 400 Purpurogallin units, and one liter of solution made up of 0.3 to 3 grams of one of the redox indicators, 0.01 to 2 M of sodium citrate buffer and the remainder water.

9. A method for determining glucose in biological fluids which comprises mixing a small sample of biological fluids with the reagent of claim 1, the ratio of the biological fluid to the reagent being between 1:100 and 1:25, incubating the mixture between about room temperature and about 40°C from about one half minute to about ten minutes, and determining the concentration of glucose by means of measuring the abosrbance.

10. A method according to claim 9 wherein the absorbance is measured at a point between 410 and 740 nm.

11. A method according to claim 9 wherein the sulfonated redox indicator is diphenylaminesulfonate.

12. A method according to claim 9 wherein the sulfonated redox indicator is diphenylbenzidinesulfonate.

13. A method according to claim 9 wherein the sulfonated redox indicator is Calcocid Blue 2 G (Color Index 42090).

14. A method according to claim 9 wherein the sulfonated redox indicator is present at a level of 30 to 900 mg percent.

15. A method according to claim 9 wherein the buffer is a sodium citrate buffer.

16. A method according to claim 9 wherein the pH is about 5.5.

17. A reagent for glucose determination in biological fluids consisting of glucose oxidase, peroxidase, a member selected from the group consisting of a sulfonated phenylamine redox indicator and a sulfonated benzidine redox indicator, and a buffer, the pH being between 4 and 5.9 when said reagent is admixed with sufficient water, and the ratio of glucose oxidase based on the EU units thereof present, to peroxidase, based on the purpurogallin units thereof present, being between 250:3 and 50:1.

18. A method for determining glucose in biological fluids which comprises admixing the reagent of claim 17 with sufficient water to achieve a pH between 4 and 5.9, mixing a smalgical fluids with the resultant reagent, the ratio of the biological fluid to the resultant reagent being between 1:100 and 1:25, incubating the mixture between about room temperature and about 40°C. from about one half minute to about ten minutes, and determining the concentration of glucose by means of measuring the absorbance.

* * * * *